US012608722B2

(12) United States Patent
Chatham et al.

(10) Patent No.: US 12,608,722 B2
(45) Date of Patent: Apr. 21, 2026

(54) DETERMINATION OF SUPPORT COSTS FOR A SCHEDULED RELEASE OF A PRODUCT

(71) Applicant: International Business Machines Corporation, Armonk, NY (US)

(72) Inventors: William Chatham, Dublin (IE); David O'Grady, Maynooth (IE); Paul John Ellis, Blackrock (IE); Garima Verma, Lucan (IE); John Carolan, Arklow (IE)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 18/420,622

(22) Filed: Jan. 23, 2024

(65) Prior Publication Data

US 2025/0238822 A1     Jul. 24, 2025

(51) Int. Cl.
G06Q 30/0202 (2023.01)
G06Q 30/015 (2023.01)

(52) U.S. Cl.
CPC ....... G06Q 30/0202 (2013.01); G06Q 30/015 (2023.01)

(58) Field of Classification Search
None
See application file for complete search history.

(56) References Cited

U.S. PATENT DOCUMENTS

| | | | |
|---|---|---|---|
| 5,918,207 A | 6/1999 | McGovern et al. | |
| 7,676,490 B1 | 3/2010 | Cassone et al. | |
| 8,027,849 B2 | 9/2011 | Johnson et al. | |
| 9,612,821 B2 | 4/2017 | Iyer et al. | |
| 9,619,363 B1 | 4/2017 | Chitale et al. | |
| 10,831,641 B2 | 11/2020 | Mahimkar | |
| 2002/0194047 A1* | 12/2002 | Edinger ............. G06Q 30/0201 705/7.29 |
| 2013/0080142 A1 | 3/2013 | Gangemi et al. | |
| 2017/0003948 A1* | 1/2017 | Iyer ..................... H04L 41/5054 |
| 2017/0091071 A1* | 3/2017 | Chitale ............ G06Q 10/06375 |
| 2017/0269905 A1 | 9/2017 | Wu et al. | |
| 2021/0208993 A1 | 7/2021 | Moyal et al. | |
| 2022/0156173 A1 | 5/2022 | Chandrasekaran et al. | |
| 2022/0405775 A1* | 12/2022 | Siebel ................ G06Q 30/0202 |
| 2025/0148487 A1* | 5/2025 | Siebel ................ G06Q 30/0202 |
| 2025/0173162 A1* | 5/2025 | Mystetskyi ......... G06F 9/44578 |

OTHER PUBLICATIONS

Mockus et al "Predictors of customer perceived software quality," Proceedings. 27th International Conference on Software Engineering, 2005. ICSE 2005., St. Louis, MO, USA, 2005, pp. 225-233, doi: 10.1109/ICSE.2005.1553565. (Year: 2005).*

* cited by examiner

*Primary Examiner* — Chesiree A Walton
(74) *Attorney, Agent, or Firm* — Zilka-Kotab, P.C.

(57) ABSTRACT

A computer-implemented method (CIM), according to one embodiment, includes building a first support profile for a first predetermined product that is scheduled to be released. The first support profile is based on historical data of predetermined types. The CIM further includes calculating, based on the first support profile, a number of expected escapes for at least a first functional area of the first predetermined product, and predicting a total number of customer cases that will result from the scheduled release. An indication of the predicted total number of customer cases is added in a cost report about the scheduled release of the first predetermined product.

13 Claims, 4 Drawing Sheets

100

100

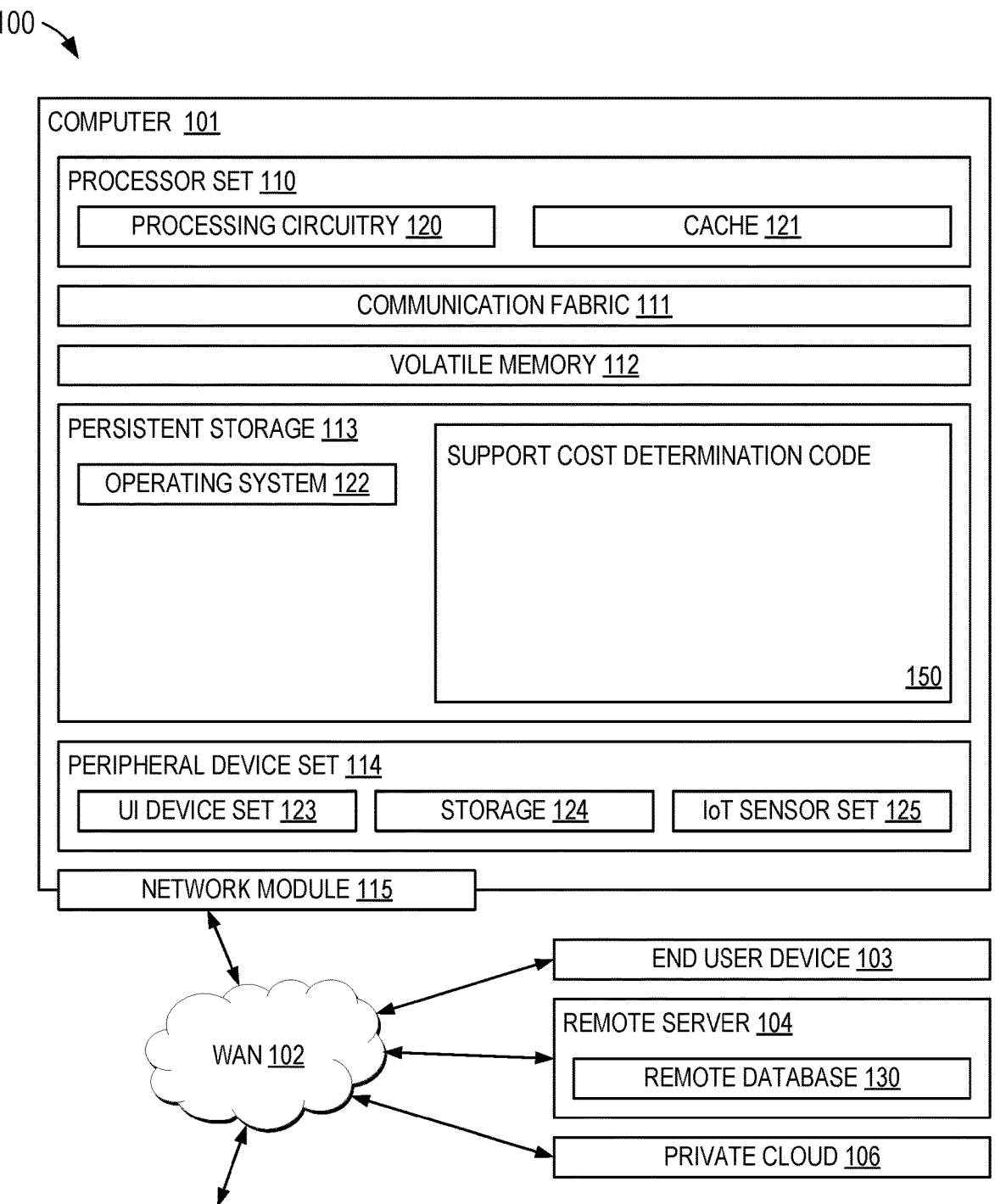

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

SUPPORT COST DETERMINATION CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

200

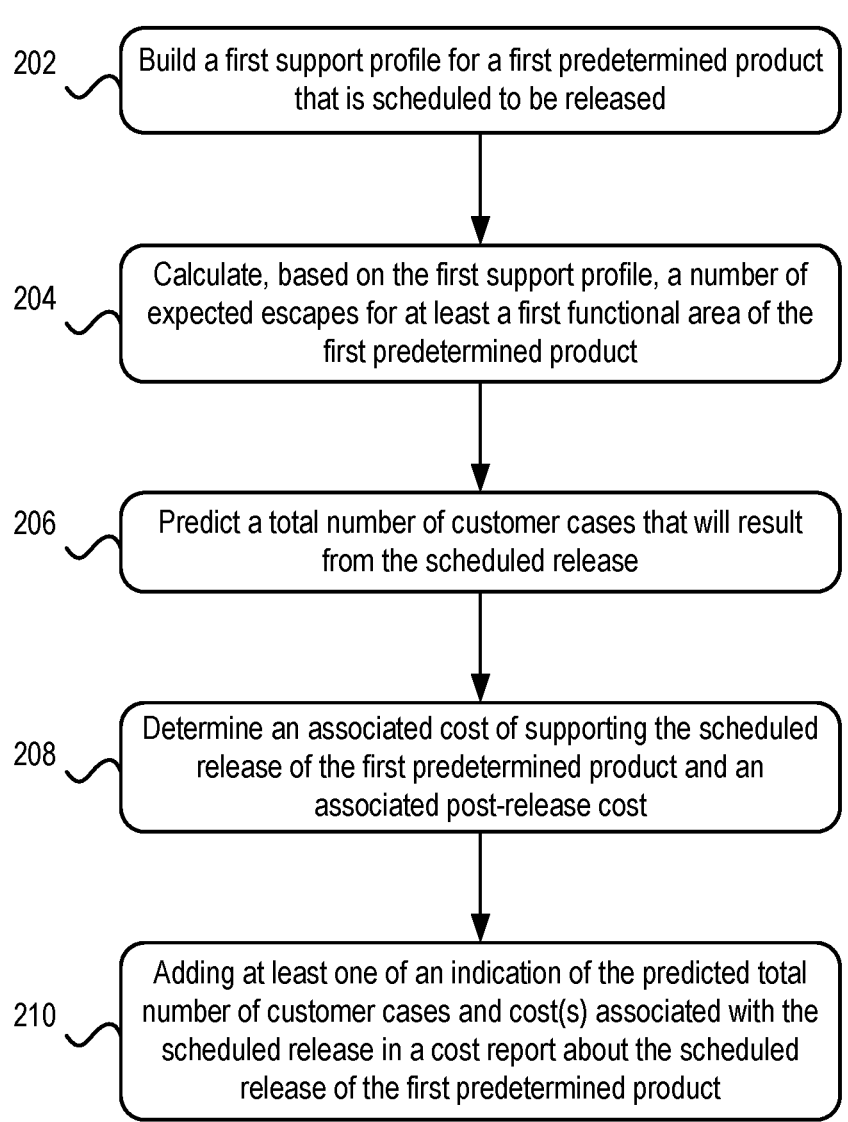

202 — Build a first support profile for a first predetermined product that is scheduled to be released 204 — Calculate, based on the first support profile, a number of expected escapes for at least a first functional area of the first predetermined product 206 — Predict a total number of customer cases that will result from the scheduled release 208 — Determine an associated cost of supporting the scheduled release of the first predetermined product and an associated post-release cost 210 — Adding at least one of an indication of the predicted total number of customer cases and cost(s) associated with the scheduled release in a cost report about the scheduled release of the first predetermined product

FIG. 2

DETERMINATION OF SUPPORT COSTS FOR A SCHEDULED RELEASE OF A PRODUCT

BACKGROUND

The present invention relates to release of products, and more specifically, this invention relates to support associated with the release of products.

The release of a given product, e.g., an initial release of a computer software program, a version update of computer software program, etc., occurs relatively often today by vendors to users using computer devices. Prior to this release, a build team typically develops such products, while at and post-release of the product, a support team typically oversees troubleshooting of the product and customer support of users that use the product on computer devices.

SUMMARY

A computer-implemented method (CIM), according to one embodiment, includes building a first support profile for a first predetermined product that is scheduled to be released. The first support profile is based on historical data of predetermined types. The CIM further includes calculating, based on the first support profile, a number of expected escapes for at least a first functional area of the first predetermined product, and predicting a total number of customer cases that will result from the scheduled release. An indication of the predicted total number of customer cases is added in a cost report about the scheduled release of the first predetermined product.

A computer program product (CPP), according to another embodiment, includes a set of one or more computer-readable storage media, and program instructions. The program instructions are collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 2 is a flowchart of a method, in accordance with one embodiment of the present invention.

DETAILED DESCRIPTION

Figure 3:
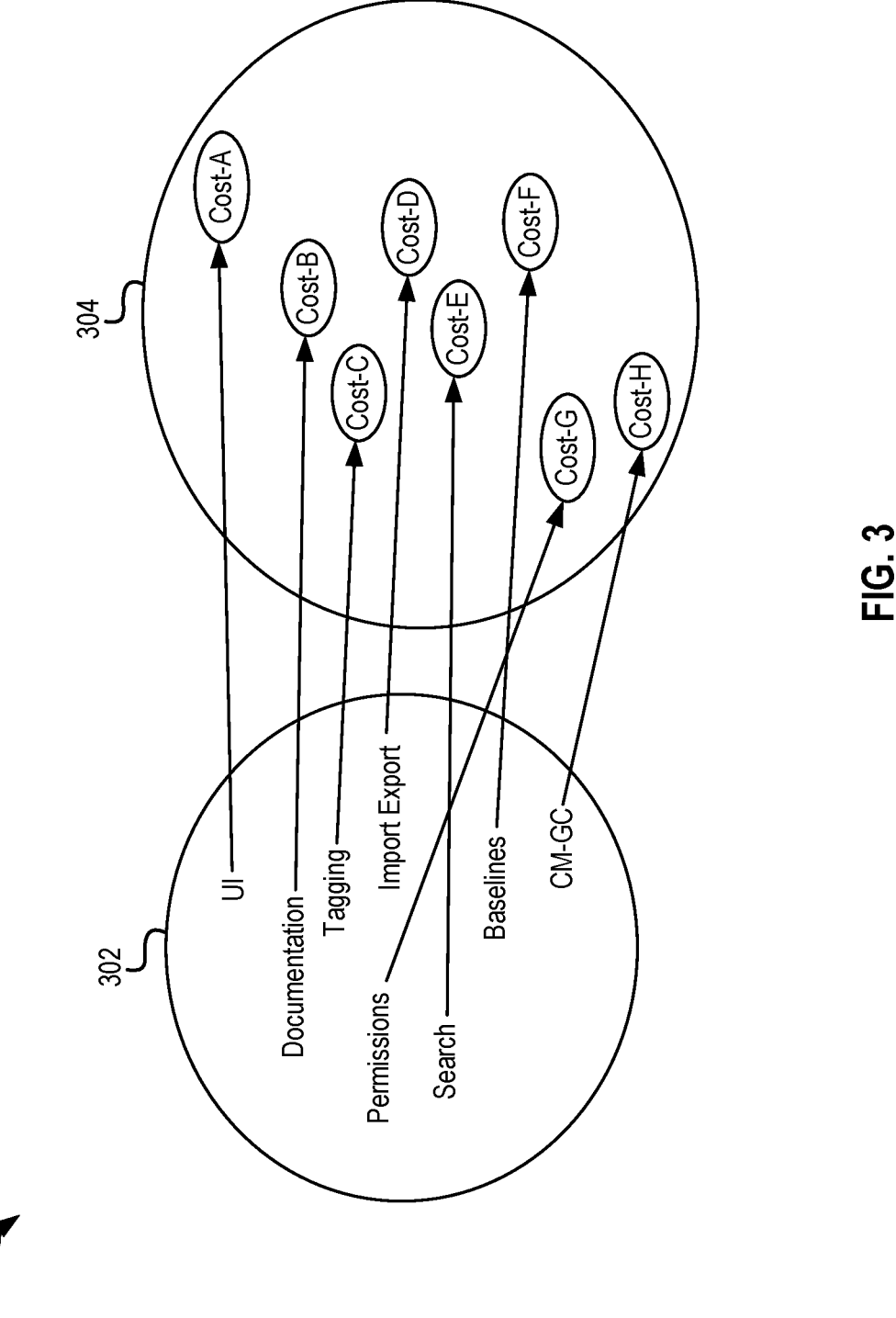
FIG. 3 is a cost breakdown, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining the support costs for a scheduled release of a predetermined product.

In one general embodiment, a CIM includes building a first support profile for a first predetermined product that is scheduled to be released. The first support profile is based on historical data of predetermined types. The CIM further includes calculating, based on the first support profile, a number of expected escapes for at least a first functional area of the first predetermined product, and predicting a total number of customer cases that will result from the scheduled release. An indication of the predicted total number of customer cases is added in a cost report about the scheduled release of the first predetermined product.

In another general embodiment, a computer program product includes a set of one or more computer-readable storage media, and program instructions. The program instructions are collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as support cost determination code of block 150 for determining the support costs for a scheduled release of a predetermined product. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertiontype connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, the release of a given product, e.g., an initial release of a computer software program, a version update of computer software program, etc., occurs relatively often today by vendors to users using computer devices. Prior to this release, a build team typically develops such products, while at and post-release of the product, a support team typically oversees troubleshooting of the product and customer support of users that use the product on computer devices.

In conventional product releases, prior to a new software release, the support team of an organization is unable to predict the resources required to service the product release. This compromises performance of network environments, and more specifically, computer devices, that deliver and use the product release because estimations of these resources are often inaccurate and thereby leads to delayed troubleshooting and support. Accordingly, there is a longstanding need within the technical field of computer based products for techniques that determine the costs and support that will be needed for a predetermined product that is scheduled to be released.

In sharp contrast to the deficiencies described in the conventional techniques described above, the techniques of embodiments and approaches described herein support delivery planners with a report and/or other computed information that provide context for understanding the resource needs for a new product release, and preferably a computer software release.

A technical advantage of techniques described herein are that the techniques are specifically tailored for support organizations. More specifically, these techniques infer a probability of support resources based upon predetermined development and quality metrics, per functional area, to predict support cases and customer escalations. These techniques ultimately determine a correlation between quality of the delivery and the cost of deploying and supporting a predetermined product release.

Now referring to FIG. 2, a flowchart of a method 200 is shown according to one embodiment. The method 200 may be performed in accordance with the present invention in any of the environments depicted in FIGS. 1-4, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 is described to be performed with respect to a first predetermined product that is scheduled to be released, but is preferably not yet released. In some other approaches, method 200 may be performed, e.g., sequentially, simultaneously, etc., with respect to a plurality of different predetermined products. In some preferred approaches, the first predetermined product and/or at least one of the other different predetermined products that method 200 may be performed with respect to is computer software code. In some of such approaches, the first predetermined product is a new computer software code release, e.g., a first version of a new computer software code. In some other approaches, the first predetermined product is an update that is released to update a previously released computer software code, e.g., to update a current version of computer software code.

Operation 202 includes building a first support profile for the first predetermined product (that is scheduled to be released but not yet released). In some approaches, building the first support profile includes obtaining and filtering data to generate a collection of data of predetermined types. For example, in some approaches, the first support profile is based on historical data of predetermined types. This historical data may, in some approaches, detail other products with at least a predetermined degree of similarity with the first predetermined product. Such approaches are particularly relevant where the first predetermined product is a new product that has not yet been released (not a version updated of the first predetermined product). In some other approaches, the historical data may detail prior versions of the first predetermined product, which may include a currently deployed version of the first predetermined product.

In some approaches, the historical data of the first support profile may be populated into the first support profile using queries to predetermined support repositories. The predetermined support repositories may include log information that is ongoingly stored in the predetermined support repositories, e.g., such as periodically during the deployment of a current version of the first predetermined product. In some other approaches, the historical data of the first support profile may be mined via reports and/or generated manually using techniques that would become apparent to one of ordinary skill in the art after reading the descriptions herein. The historical data of the first support profile may, in some preferred approaches, include cases logged per predetermined functional area(s). For example, in some approaches, the historical data preferably detail cases logged for a plurality of different functional areas, e.g., a first functional area of products, a second functional area of products, a third functional area of products, etc. For context, a predetermined functional area may be a defined portion of logic and/or a component that may be observed such that performance information and statistics may be gathered over a predetermined period of time. For example, in some preferred approaches, the functional area may be a portion (segment) of a predetermined computer code that is updated, e.g., such as approaches in which the first predetermined product is a computer software code. In some other approaches, the functional area may be a hardware component. In one or more of such approaches, the hardware component may be scheduled to be released by being scheduled to be added to a predetermined infrastructure. In some other approaches, the functional area may be related to a migration plan. For example, in one approach, the functional area may be a database that data is migrated to as part of a predetermined data backup migration plan. Various illustritive examples of historical data that may be added to a support profile are described below.

The historical data that may be added to a support profile, in some approaches, includes a total number of support hours that have been recorded in previous releases, e.g., previous version releases of the first predetermined product and/or releases of one or more other predetermined product. These support hours may include hours that were consumed by predetermined actors, e.g., administrators, troubleshooting computer devices, processors, servers, predetermined bandwidth, etc., to perform predetermined support tasks, e.g., troubleshooting, uploading patches, developing patches, speaking with customers, diagnosing reported customer issues, etc. These support hours may, in some approaches, be determined by auditing cases (according to predetermined keywords and/or other criteria) logged per predetermined functional area(s). These cases may, in some approaches, include cases which previously led to new defects. In some other approaches, these cases may additionally and/or alternatively include, e.g., cases which led to out-of-cycle patches, cases which led to customer complaints, etc. Information that is added to the first support profile may additionally and/or alternatively detail how cases generated are generated, cases that are received as complaints, cases that are escalated at some point (level three (L3) technical support and/or development assistance to resolve, cases that received a net promotor score (NPS) (detractor: <6), etc.

Operation 204 includes calculating, based on the first support profile, a number of expected escapes for at least a first functional area of the first predetermined product. For context, escapes may be defined as defects that exists in the first predetermined product that have a potential for compromising functionality in computer devices once the first predetermined product is released. In some approaches, escapes are portions of a computer software code that were not detected during a development and testing process of the first predetermined product. In some preferred approaches, standard development metrics of predicted defect escapes are used to calculate the number of expected escapes. The standard development metrics may, in some approaches, be based on lines of code (LoC) per functional area. Furthermore, testing may be performed on at least the first functional area of the first predetermined product to determine an impact of the scheduled release. For example, coverage in the functional area may be tested to determine the impact of a forthcoming change in versions, e.g., delta. In some illustrative approaches, in order to calculate the number of expected escapes per functional area, the number of defects within the functional area may be determined and/or predicted. In some approaches, compiling techniques that would become apparent to one of ordinary skill in the art after reading the descriptions herein may be used to determine the number of defects that a functional area of code includes. In some approaches this functional area may include a portion of computer code of the first predetermined product that has been updated, e.g., at least a predetermined number of edits have been performed, since a most previous version release of the first predetermined product. In some other approaches, calculating the number of expected escapes per functional area may be based on a predetermined test efficiency indicator (TEI) process. It should be noted that some techniques for determining a TEI with respect to weighting is described elsewhere herein.

Operation 206 includes predicting a total number of customer cases that will result from the scheduled release. In some preferred approaches, the total number of customer cases are predicted based on the historical data of the first support profile and/or historical development data, e.g., the calculated number of escapes. Predicting a total number of customer cases, in some approaches, includes using a predetermined conditional probability technique to predict total number of customer cases. In one preferred approach, the predetermined conditional probability technique is based on Bayes Theorem, which, in some approaches, does not take time into account. A formula representation of the Bayes Theorem is included below (hereafter referred to as the Bayes Theorem formula) where A and B are events, e.g., such as one or more customer cases occurring, and P(B)≠0.

$$P(A \mid B) = \frac{P(B \mid A)P(A)}{P(B)}$$

When using the Bayes Theorem formula, P(A/B) is a conditional probability for the probability of event A occurring given that B is true. Furthermore, P(B/A) is also a conditional probability. This probability is of event B occurring given that A is true. This may also be interpreted as the likelihood of B given a fixed A because P(B/A)=L(A/B). P(A) and P(B) are the probabilities of observing A and B respectively without any given conditions, where they may be known as the prior and marginal probability respectively.

In one or more approaches in which the Bayes Theorem formula is used to predict the total number of customer cases, the variable A may represent data from a predetermined development evaluation process, e.g., a predetermined weighting algorithm, etc., during which the variable A is assigned a weighted value. In other words, the variable A may represent the amount of support that developing the first predetermined product has and/or will take. The variable B may represent data from a predetermined support evaluation process, during which the variable B is also is assigned a corresponding assigned weight value. Accordingly, in some approaches, method 200 includes characterizing variables used for predicting the total number of customer cases according to a predefined quality weighting scale. These variables are preferably then input into a predetermined conditional probability technique used to predict the total number of customer cases, e.g., the Bayes Theorem formula. Illustritive descriptions for the predetermined development evaluation process and the predetermined support evaluation process are described below.

In some approaches, the predetermined development evaluation process may be based on a predetermined development team's choice of an industry standard that is to be applied as a quality metric. For example, the industry standard that is to be applied as a quality metric may specify that a TEI of 25% or greater is considered relatively bad (and thereby assigned a weight pre-associated with relatively bad TEIs), while a TEI of 25% or greater is considered relatively good (and thereby assigned a weight pre-associated with relatively good TEIs). A weighting of the predetermined development evaluation process may be equal to the number of defects that exist per 1000 lines of code of the first predetermined product plus the TEI value. This way, a TEI of 5% may be determined in response to a determination that 95% of lines of code of the first predetermined product passes review (does not include a defect). The weighting of this scenario would be a relatively small value (based on the relatively few defects). Accordingly, for a predetermined scale of weightings in which a weighting of "1" represents a relatively good weighting (cases expected to be resolved in relatively less time), a weighting of "3" represents a relatively average weighting (predicted cases expected to be resolved in about the same time as the cases that have occurred for a previous version of the first predetermined product), and a weighting of "5" represents a relatively bad weighting (predicted cases expected to be resolved in relatively more time than the cases that have occurred for a previous version of the first predetermined product), the weighting of this scenario would be 1. In some approaches, in response to the weighting determined from the predetermined development evaluation process falling into the value "1", there may be determined to be a 20% chance that release of the first predetermined product will result in a relatively higher number of cases than other releases of products considered.

In some approaches, the predetermined support evaluation process may be based on a predetermined support organization's choice of an industry standard to apply to the predetermined support evaluation process. For example, the predetermined support evaluation process may determine that the predicted total hours to support the first predetermined product after it is released may be equal to the hours per case (HPC) per predetermined functional area (PFA). A predetermined scale of weightings may be applied to results of this process using techniques similar to those described above for the predetermined development evaluation process, e.g., weight of 1 represents good (cases resolved in relatively less time), weight of 3 represents no change (hours per case remains the same), and weight of 5 represents bad (relatively more time to resolve cases). In response to the weighting determined from the predetermined support evaluation process falling into the value "5", there is a 100% chance that release of the first predetermined product will result in a relatively higher cost in hours to support the first predetermined product.

With continued reference to the Bayes Theorem formula described above, as a result of obtaining the probability P(A/B) by using one or more of the techniques described above, decisions may be made as to how to prepare support resources for the expected impact of the scheduled release of the first predetermined product, or as to how to request furthermore development/refinement of the first predetermined product based on the data produced using the techniques described herein, e.g., whether some changes can be reviewed further prior to release, whether some changes cab be held back until a later date, etc.

The predetermined conditional probability technique used to predict the total number of customer cases may additionally and/or alternatively be based on a time series regression. For context, time series regression is a statistical method for predicting a future response based on the response history (known as autoregressive dynamics) and the transfer of dynamics from relevant predictors. Time series regression may be used to understand and predict the behavior of dynamic systems from experimental or observational data. In some approaches, a time series analysis may begin by building a design matrix (Xt), also called a feature or regressor matrix, which may include current and past observations of predictors ordered by time (t). Then, ordinary least squares (OLS) may be applied to a predetermined multiple linear regression (MLR) model, e.g., see the MLR model included below.

$$yt = Xt\beta + et$$

This application may be performed to obtain an estimate of a linear relationship of the response (yt) to the design matrix. The variable β represents the linear parameter estimates to be computed and (et) represents the innovation terms. This form can be generalized to multivariate cases vector (yt), including exogenous inputs such as control signals, and correlation effects in the residues. For relatively more difficult cases, the linear relationship may be replaced by a nonlinear one, e.g., yt=f(Xt,et), where f( ) is a nonlinear function such as a neural network.

In some approaches, a predetermined threshold may be applied to results of the techniques described above for predicting the total number of customer cases that will result from the scheduled release. For example, in some approaches, the total number of customer cases are cases, determined from results of using the predetermined conditional probability technique, determined to have at least a predetermined threshold probability of occurring, e.g., at least 50% probability of occurring, at least 75% probability of occurring, at least 95% probability of occurring, etc. Furthermore, it should be noted that the techniques described above for predicting the total number of customer cases may be performed sequentially and/or in parallel with respect to two or more of the functional areas. In other words, a plurality of functional areas, including the first functional area, may be tested for predicting the total number of customer cases.

Operation 208 includes determining, for each of the functional areas, an associated cost of supporting the scheduled release of the first predetermined product. Furthermore, operation 208 may include determining, for each of the functional areas, an associated post-release cost. These costs may be determined by using techniques that would become apparent to one of ordinary skill in the art after reading the descriptions herein. For example, in some preferred approaches, the costs may be determined by calculating, for each of the predicted customer cases that are determined to have a predetermined threshold probability of occurring, an associated cost of the customer case. This may include matching the predicted customer cases with a previous customer case, e.g., a customer case with at least a predetermined degree of similarity, and using the cost of the previous customer case.

Operation 210 includes adding an indication of the predicted total number of customer cases in a cost report about the scheduled release of the first predetermined product. Furthermore, in some approaches, a sum of the associated costs of supporting the scheduled release of the first predetermined product and the determined associated post-release costs in the cost report, e.g., as determined in operation 208, may additionally and/or alternatively be added to the cost report, e.g., see operation 210. The cost report may be output to a predetermined target, e.g., a predetermined device, a graphical user interface, a predetermined machine learning algorithm, etc. This way a decision may be made whether the scheduled release exceeds predetermined release thresholds, e.g., a budget, a processing resource capability, etc.

The techniques described above support delivery planners to understand the resource needs for a new release of a predetermined product. For example, the information of a cost report may be used to schedule engineers, devise training plans and allocate hardware/software licenses. The cost of post-delivery per release of a predetermined product allows business stakeholders, e.g., development, test, support, product management, etc., to understand the risk involved with a scheduled release. If the cost and/or risk is considered high, this becomes an input to the development timelines and resource allocation to the relatively most impactful areas to reduce the predicted risk.

The outputs that are derived from the techniques described above allow a support organization to understand the resources required to support a scheduled release of a predetermined product. Furthermore, end clients/customers are able to understand how the release in question relates to their implementation, where to concentrate resources to prove that the predetermined product out and ensure that the scheduled release does not have unintended consequences within an ecosystem. Yet furthermore, these techniques ensure that development teams are able to plan resources post-release, as well as provide additional feedback-loop considerations for quality.

The techniques described herein are novel in that, for the first time, the experience of supporting a product may be applied to determine the cost of owning and supporting that product at the point of release. Support data (cost to support in cases, hours per case, web sessions, escalations, defects, patches, complaints, meetings, etc.) and additional assessments of customer use of tools may be combined with historical data and testing metrics to help calculate the risk and cost of supporting a specific product's release based on content determined to be associated with the predetermined product. For example, at a relatively high level, the output of the techniques described above may detail that there is an historical correlation that would be applicable to an average release, to state that for product "X", given a predetermined number of features, technical debt, and defects, a predicted number of engineers are likely to be needed. Utilizing this data in a relatively more granular way, as a product matures, the techniques described herein identify problem areas and augment general predictions with relatively accurate impact data of a cost report.

FIG. 3 depicts a cost breakdown 300, in accordance with one embodiment. As an option, the present cost breakdown 300 may be implemented in conjunction with features from any other embodiment listed herein, such as those described with reference to the other FIGS. Of course, however, such cost breakdown 300 and others presented herein may be used in various applications and/or in permutations which may or may not be specifically described in the illustrative embodiments listed herein. Further, the cost breakdown 300 presented herein may be used in any desired environment.

The cost breakdown 300 includes a first circle 302 that illustrates a plurality of potential functional areas that costs associated with the release of a predetermined product may arise from. For example, according to some approaches, the potential functional areas may include user interfaces (UI), documentation, tagging, permissions that need to be obtained before releasing the predetermined product, import and export requirements, searches that need to be performed, baselines, and construction management costs (CM-GC).

A second circle 304 illustrates a plurality of costs associated with these potential functional areas, e.g., see Cost-A that is associated with UI functional areas, Cost-B that is associated with documentation functional areas, Cost-C that is associated with tagging functional areas, etc.

In some approaches, classifications of work performed for a release may be used to establish the functional areas. The cost of supporting changes per functional area may then be calculated the costs may be aggregated to determine the cost of supporting a release of a predetermined product. For example, with continued reference to FIG. 3, the cost of supporting the release of a predetermined product may include the cost of supporting each of the functional areas, e.g., Cost-A plus Cost-B plus Cost-C, etc. In some approaches, the post-release costs for a given one of the functional areas, e.g., functional area A, may include a sum of the predicted support cost for a customer and the development maintenance cost of a predetermined product.

Figure 4:
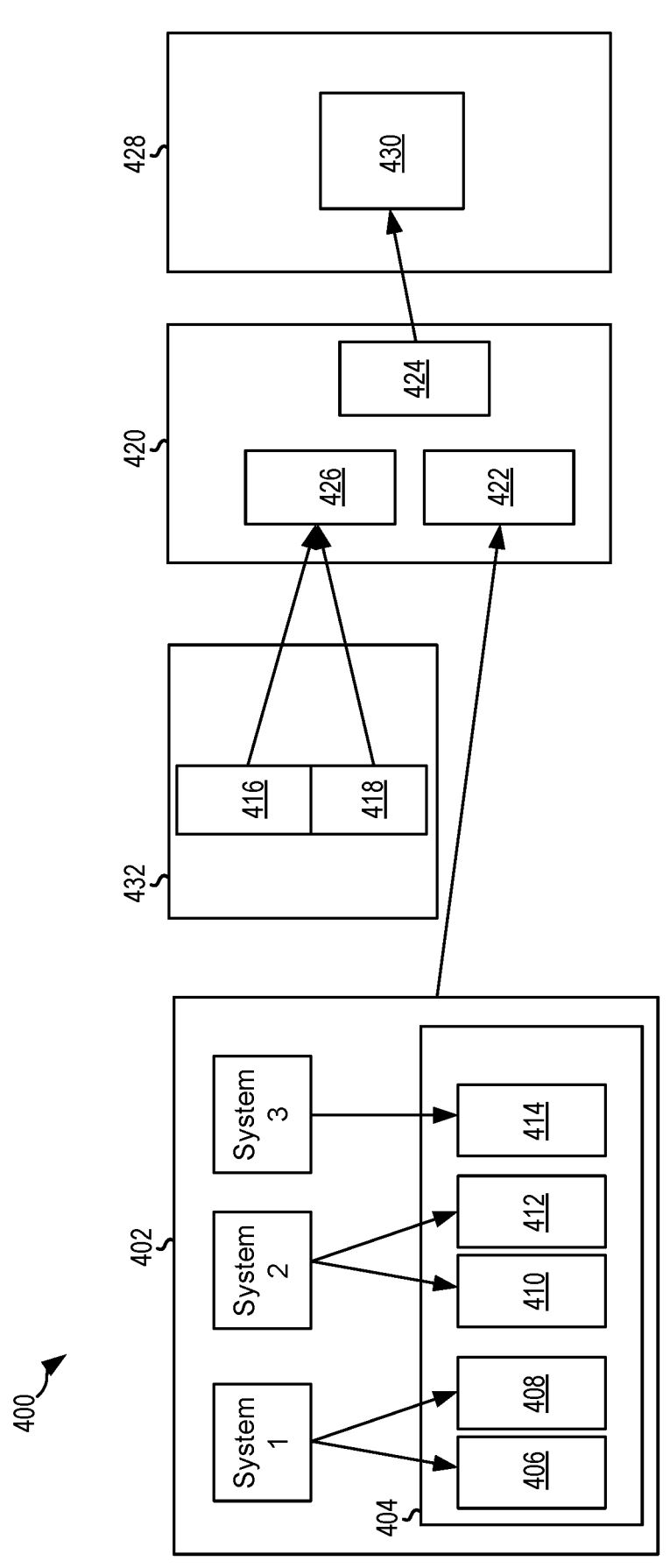
FIG. 4 is an environment, in accordance with one embodiment of the present invention.

FIG. 4 depicts an environment 400, in accordance with one embodiment. As an option, the present environment 400 may be implemented in conjunction with features from any other embodiment listed herein, such as those described with reference to the other FIGS. Of course, however, such environment 400 and others presented herein may be used in various applications and/or in permutations which may or may not be specifically described in the illustrative embodiments listed herein. Further, the environment 400 presented herein may be used in any desired environment.

Environment 400 illustrates logical flows of information from predetermined systems, which may be used to generate a cost report about the scheduled release of a predetermined product. For example, a first portion 402 of the environment may include a plurality of systems, e.g., see System 1-System 3, that are each configured to obtain information about different functional areas 404 associated with the release of the predetermined product. For example, System 1 is configured to obtain and/or provide first information 406 that details hours per case which has previously led to defects, and second information 408 that details the number of hours that it takes to generate a case. Similarly, System 2 is configured to obtain and/or provide third information 410 that details hours per case which led to out of cycle patches, and fourth information 412 which details hours per case that led to predetermined types of escalations. Furthermore, System 3 is configured to obtain and/or provide fifth information 414 that details hours per case which led to computer complaints. This information may be output as historical customer case data per functional area 422 which is received by a third portion 420 of the environment. In some approaches, this information may be based on a delta comparison of past releases and/or an output from a development team's test coverage and predicted defects/escapes. This historical information over time enables predictions to be made using the techniques described elsewhere above in method 200, which may be performed in a determination module 424 of the third portion 420 of the environment.

In a second portion 432 of the environment expectations and predictions associated with the scheduled release may be obtained. For example, expectation 416 may be based on information about expected defects that are based on test coverage for a predetermined area, while prediction 418 may be based on a number of predicted defects. This information may be used to determine a number of expected escapes per functional area, e.g., see determination 426.

In a fourth portion 428 of the environment, a cost report 430 is generated using techniques described elsewhere herein, e.g., see method 200.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

16

What is claimed is:

1. A computer-implemented method (CIM), the CIM comprising:

using systems of an environment to obtain historical data of different predetermined types;

querying support repositories on which the obtained historical data of the different predetermined types is stored by the systems;

building a first support profile for a first predetermined product that is scheduled to be released but not yet released, wherein the first support profile is based on the historical data, wherein the first predetermined product is computer software code that is centrally hosted on a computing platform and allocated on a subscription basis as Software as a Service (SaaS);

calculating, based on the first support profile, a number of expected escapes for at least a first functional area of the computer software code, wherein the calculating the number of expected escapes for at least the first functional area of the computer software code includes testing at least the first functional area of the computer software code to determine an impact of the scheduled release;

predicting a total number of customer cases that will result from the scheduled release;

adding an indication of the predicted total number of customer cases in a cost report about the scheduled release of the computer software code; and outputting the cost report to a machine learning algorithm, wherein the machine learning algorithm uses the cost report to determine, based on predetermined release thresholds of processing resource capabilities within the computing platform, whether to release the computer software code, wherein the use of the cost report additionally includes the machine learning model determining how to allocate hardware and software licenses, wherein the allocation includes allocating the resources within the computing platform to a first functional area to mitigate a predicted risk that the first functional area is predicted to be subject to, wherein the historical data details cases about a second predetermined product that is different than the first predetermined product, wherein the historical data is logged for a plurality of different functional areas including the first functional area, wherein the functional areas include hardware components that are added to predetermined infrastructure, wherein the second predetermined product has at least a predetermined degree of similarity with the first predetermined product, wherein predicting a total number of customer cases includes using a predetermined conditional probability technique to predict total number of customer cases, wherein the predetermined conditional probability technique is based on Bayes Theorem, wherein a variable of a formula used in the predetermined conditional probability technique represents data from a weighted predetermined support evaluation process, wherein the predetermined support evaluation process is based on a predetermined development team's choice of an industry standard that is to be applied as a quality metric for the predetermined conditional probability technique, wherein a weighting of the predetermined support evaluation process is equal to a number of defects that exist per 1000 lines of code of the first predetermined product plus a test efficiency indicator (TEI) value, wherein the TEI value results from performing a predetermined TEI process for calculating the number of expected escapes for at least the first functional area of the computer software code.

2. The CIM of claim 1, comprising: characterizing variables used for predicting the total number of customer cases according to a predefined quality weighting scale, and inputting the variables into a predetermined conditional probability technique used to predict the total number of customer cases.

3. The CIM of claim 1, wherein the expected escapes are defined as defects that exist in the computer software code that have a potential for compromising functionality in computer devices running the computer software code once the first predetermined product is released, wherein the expected escapes are portions of the computer software code that were not detected during a development and testing process of the computer software code, wherein the calculating the number of expected escapes for at least the first functional area of the computer software code further includes performing predetermined test efficiency indicator (TEI) process.

4. The CIM of claim 1, wherein the predetermined conditional probability technique is based on a time series regression, wherein the historical data details a total number of hours support hours previously spent by troubleshooting computer devices to perform diagnosing reported customer issues associated with the hardware components, wherein the reported customer issues are identified by auditing past customer cases logged for the first functional area, wherein the auditing comprises performing a predetermined keyword audit within the past customer cases for cases that received a net promotor score (NPS) characterized by having a detractor value of less than the value six, wherein the past customer cases led to out-of-cycle patches on the hardware components.

5. The CIM of claim 1, wherein the total number of customer cases are cases, determined from results of using the predetermined conditional probability technique, determined to have at least a predetermined threshold probability of occurring.

6. The CIM of claim 5, wherein a plurality of functional areas, including the first functional area, are tested for predicting the total number of customer cases, and comprising: determining, for each of the functional areas, an associated cost of supporting the scheduled release of the computer software code; determining, for each of the functional areas, an associated post-release cost; and adding a sum of the associated costs of supporting the scheduled release of the computer software code and the determined associated post-release costs in the cost report.

7. A computer program product (CPP), the CPP comprising:

a set of one or more computer-readable storage media;

program instructions, collectively stored in the set of one or more computer-readable storage media, for causing a processor set to perform the following computer operations:

use systems of an environment to obtain historical data of different predetermined types;

query support repositories on which the obtained historical data of the different predetermined types is stored by the systems;

build a first support profile for a first predetermined product that is scheduled to be released but not yet released, wherein the first support profile is based on the historical data, wherein the first predetermined product is computer software code that is centrally hosted on a computing platform and allocated on a subscription basis as Software as a Service (SaaS);

calculate, based on the first support profile, a number of expected escapes for at least a first functional area of the computer software code, wherein the calculating the number of expected escapes for at least the first functional area of the computer software code includes testing at least the first functional area of the computer software code to determine an impact of the scheduled release;

predict a total number of customer cases that will result from the scheduled release;

add an indication of the predicted total number of customer cases in a cost report about the scheduled release of the computer software code; and output the cost report to a machine learning algorithm, wherein the machine learning algorithm uses the cost report to determine, based on predetermined release thresholds of processing resource capabilities within the computing platform, whether to release the computer software code, wherein the use of the cost report additionally includes the machine learning model determining how to allocate hardware and software licenses, wherein the allocation includes allocating the resources within the computing platform to a first functional area to mitigate a predicted risk that the first functional area is predicted to be subject to, wherein the historical data details cases about a second predetermined product that is different than the first predetermined product, wherein the historical data is logged for a plurality of different functional areas including the first functional area, wherein the functional areas include hardware components that are added to predetermined infrastructure, wherein the second predetermined product has at least a predetermined degree of similarity with the first predetermined product, wherein predicting a total number of customer cases includes using a predetermined conditional probability technique to predict total number of customer cases, wherein the predetermined conditional probability technique is based on Bayes Theorem, wherein a variable of a formula used in the predetermined conditional probability technique represents data from a weighted predetermined support evaluation process, wherein the predetermined support evaluation process is based on a predetermined development team's choice of an industry standard that is to be applied as a quality metric for the predetermined conditional probability technique, wherein a weighting of the predetermined support evaluation process is equal to a number of defects that exist per 1000 lines of code of the first predetermined product plus a test efficiency indicator (TEI) value, wherein the TEI value results from performing a predetermined TEI process for calculating the number of expected escapes for at least the first functional area of the computer software code.

8. The CPP of claim 7, the CPP comprising: program instructions, collectively stored in the set of one or more storage media, for causing the processor set to perform the following computer operations: characterize variables used for predicting the total number of customer cases according to a predefined quality weighting scale, and inputting the variables into a predetermined conditional probability technique used to predict the total number of customer cases.

9. The CPP of claim 7, wherein the expected escapes are defined as defects that exist in the computer software code that have a potential for compromising functionality in computer devices running the computer software code once the first predetermined product is released, wherein the expected escapes are portions of the computer software code that were not detected during a development and testing process of the computer software code, wherein the calculating the number of expected escapes for at least the first functional area of the computer software code further includes performing predetermined test efficiency indicator (TEI) process.

10. The CPP of claim 7, wherein the predetermined conditional probability technique is based on a time series regression, wherein the historical data details a total number of hours support hours previously spent by troubleshooting computer devices to perform diagnosing reported customer issues associated with the hardware components, wherein the reported customer issues are identified by auditing past customer cases logged for the first functional area, wherein the auditing comprises performing a predetermined keyword audit within the past customer cases for cases that received a net promotor score (NPS) characterized by having a detractor value of less than the value six, wherein the past customer cases led to out-of-cycle patches on the hardware components.

11. The CPP of claim 7, wherein the total number of customer cases are cases, determined from results of using the predetermined conditional probability technique, determined to have at least a predetermined threshold probability of occurring.

12. The CPP of claim 11, wherein a plurality of functional areas, including the first functional area, are tested for predicting the total number of customer cases, and the CPP comprising: program instructions, collectively stored in the set of one or more storage media, for causing the processor set to perform the following computer operations: determine, for each of the functional areas, an associated cost of supporting the scheduled release of the computer software code; determine, for each of the functional areas, an associated post-release cost; and add a sum of the associated costs of supporting the scheduled release of the computer software code and the determined associated post-release costs in the cost report.

13. A computer system (CS), the CS comprising:
a processor set;
a set of one or more computer-readable storage media;
program instructions, collectively stored in the set of one or more storage media, for causing the processor set to perform the following computer operations:
use systems of an environment to obtain historical data of different predetermined types;
query support repositories on which the obtained historical data of the different predetermined types is stored by the systems;
build a first support profile for a first predetermined product that is scheduled to be released but not yet released, wherein the first support profile is based on the historical data, wherein the first predetermined product is computer software code that is centrally hosted on a computing platform and allocated on a subscription basis as Software as a Service (SaaS);
calculate, based on the first support profile, a number of expected escapes for at least a first functional area of the computer software code,
wherein the calculating the number of expected escapes for at least the first functional area of the computer software code includes testing at least the first functional area of the computer software code to determine an impact of the scheduled release;
predict a total number of customer cases that will result from the scheduled release;
add an indication of the predicted total number of customer cases in a cost report about the scheduled release of the computer software code; and
output the cost report to a machine learning algorithm, wherein the machine learning algorithm uses the cost report to determine, based on predetermined release thresholds of processing resource capabilities within the computing platform, whether to release the computer software code,
wherein the use of the cost report additionally includes the machine learning model determining how to allocate hardware and software licenses, wherein the allocation includes allocating the resources within the computing platform to a first functional area to mitigate a predicted risk that the first functional area is predicted to be subject to,
wherein the historical data details cases about a second predetermined product that is different than the first predetermined product, wherein the historical data is logged for a plurality of different functional areas including the first functional area, wherein the functional areas include hardware components that are added to predetermined infrastructure, wherein the second predetermined product has at least a predetermined degree of similarity with the first predetermined product,
wherein predicting a total number of customer cases includes using a predetermined conditional probability technique to predict total number of customer cases,
wherein the predetermined conditional probability technique is based on Bayes Theorem, wherein a variable of a formula used in the predetermined conditional probability technique represents data from a weighted predetermined support evaluation process, wherein the predetermined support evaluation process is based on a predetermined development team's choice of an industry standard that is to be applied as a quality metric for the predetermined conditional probability technique, wherein a weighting of the predetermined support evaluation process is equal to a number of defects that exist per 1000 lines of code of the first predetermined product plus a test efficiency indicator (TEI) value, wherein the TEI value results from performing a predetermined TEI process for calculating the number of expected escapes for at least the first functional area of the computer software code.

* * * * *